(12) United States Patent
Ayash et al.

(10) Patent No.: US 9,077,939 B1
(45) Date of Patent: Jul. 7, 2015

(54) EXTENSION COLOR GAMUT QUEUE

(71) Applicant: XEROX CORPORATION, Norwalk, CT (US)

(72) Inventors: Barry K. Ayash, Webster, NY (US); Mark A. Rule, Rochester, NY (US); James E. Quigley, Manchester, NY (US); Joseph M. Harrison, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/497,482

(22) Filed: Sep. 26, 2014

(51) Int. Cl.
*H04N 1/60* (2006.01)
*H04N 1/00* (2006.01)

(52) U.S. Cl.
CPC ........... *H04N 1/6066* (2013.01); *H04N 1/6008* (2013.01); *H04N 1/00503* (2013.01); *H04N 1/00538* (2013.01)

(58) Field of Classification Search
None
See application file for complete search history.

(56) References Cited

U.S. PATENT DOCUMENTS

| | | | |
|---|---|---|---|
| 6,318,852 B1 | 11/2001 | White | |
| 7,164,498 B2 * | 1/2007 | Van Bael | 358/1.9 |
| 7,649,649 B2 | 1/2010 | Eschbach et al. | |
| 7,898,696 B2 * | 3/2011 | Marchesotti et al. | 358/3.27 |
| 8,259,346 B2 * | 9/2012 | Walton et al. | 358/1.9 |
| 8,294,948 B2 | 10/2012 | Mestha et al. | |
| 8,564,828 B2 | 10/2013 | Farrell et al. | |
| 2002/0163570 A1 * | 11/2002 | Phillips | 347/224 |
| 2004/0066525 A1 * | 4/2004 | Zerza et al. | 358/1.14 |
| 2005/0243343 A1 * | 11/2005 | Ng | 358/1.9 |
| 2007/0008558 A1 * | 1/2007 | Rumph et al. | 358/1.9 |
| 2007/0263237 A1 * | 11/2007 | Robinson | 358/1.9 |
| 2013/0265593 A1 | 10/2013 | Maltz | |
| 2013/0265598 A1 | 10/2013 | Donaldson et al. | |
| 2014/0009769 A1 * | 1/2014 | Robinson et al. | 358/1.9 |

* cited by examiner

*Primary Examiner* — Dung Tran
(74) *Attorney, Agent, or Firm* — Gibb & Riley, LLC

(57) ABSTRACT

Methods and devices automatically determine a base color gamut of base marking materials and extension color gamuts of extension marking materials. As each print job is received, these methods and devices automatically evaluate the print job to determine the print job color gamut. Then, the methods and devices can automatically determine the closest match between: the print job color gamut; and the base color gamut or one of the extension color gamuts to identify a matching color gamut. Further, these methods and devices automatically output the matching color gamut (and potentially a corresponding interchangeable supply container, if the matching color gamut is one of the extension color gamuts) by, for example, displaying the matching color gamut and the corresponding interchangeable supply container in at least one additional column in a print queue, or displaying the matching color gamut and the corresponding interchangeable supply container in a separate gamut queue.

20 Claims, 7 Drawing Sheets

| PRINT JOB | STATUS | OWNER | COLOR GAMUT | HOUSING UNIT | Ext. Pages |
|---|---|---|---|---|---|
| 887643 | PRINTING | pwilliam | Orange | O | 2 |
| 24567 | WAITING | Ssara | CMYK | None | None |
| 347221 | WAITING | masad | Orange | O | 8-22 |
| 15986 | WAITING | korook | Violet | V | 4, 7, 9 |
| 843530 | WAITING | dpelone | CMYK | None | None |
| 2276587 | WAITING | bnigh | Green | G | 8 |

PRINT QUEUE (302, 304, 306, 308, 310, 312) — 300

| PRINT QUEUE | | | | | |
|---|---|---|---|---|---|
| PRINT JOB | STATUS | OWNER | COLOR GAMUT | HOUSING UNIT | Ext. Pages |
| 887643 | PRINTING | pwilliam | Orange | O | 2 |
| 24567 | WAITING | Ssara | CMYK | None | None |
| 347221 | WAITING | masad | Orange | O | 8-22 |
| 15986 | WAITING | korook | Violet | V | 4, 7, 9 |
| 843530 | WAITING | dpelone | CMYK | None | None |
| 2276587 | WAITING | bnigh | Green | G | 8 |

FIG. 5

| GAMUT QUEUE | | | | |
|---|---|---|---|---|
| PRINT JOB | OWNER | COLOR GAMUT | HOUSING UNIT | Ext. Pages |
| 887643 | pwilliam | Orange | O | 2 |
| 24567 | Ssara | CMYK | None | None |
| 347221 | masad | Orange | O | 8-22 |
| 15986 | korook | Violet | V | 4, 7, 9 |
| 843530 | dpelone | CMYK | None | None |
| 2276587 | bnigh | Green | G | 8 |

FIG. 6

EXTENSION COLOR GAMUT QUEUE

BACKGROUND

Systems and methods herein generally relate to methods and printing devices that use extension color gamuts, such as those that utilize interchangeable housing units to selectively supply different extension marking materials that provide the extension color gamuts.

Many printing devices allow the user to select different color gamuts to use for printing. Some printing devices utilize interchangeable housing units to selectively supply different extension marking materials that provide the extension color gamuts. In operation, the operator is told which color profile or gamut to use, or the user applies a trial-and-error process to determine which profile looks better in test prints. However, such processes can be inefficient and/or frustrating to the user.

SUMMARY

An exemplary printing apparatus herein can include, but is not limited to, a processor, a user interface operatively (meaning directly or indirectly) connected to the processor, a printing engine operatively connected to the processor, permanent supply containers operatively connected to the processor, and at least one receptacle operatively connected to the processor. The permanent supply containers maintain base marking materials used by the printing engine to print. While the permanent supply containers can be replaced or refilled as their contents are consumed, the permanent supply containers (and the same color base marking materials) are always present within the printing apparatus whenever any printing operation is performed.

The receptacle is shaped to connect to interchangeable supply containers that maintain extension marking materials used by the printing engine to print. The extension marking materials are different colors than the colors of the base marking materials. The extension marking materials are for printing operations that utilize color gamuts that are different than those color gamuts available with the base marking materials alone. For example, the base marking materials can consist of cyan, magenta, yellow, and black (CMYK); or any other base marking material set; while the extension marking materials can be colors other than CMYK and other base marking material sets.

In contrast to the permanent supply containers that always make the base marking materials available to the printing engine for all printing operations, the interchangeable supply containers may or may not be used, and different interchangeable supply containers will be used to provide different color gamuts that are not provided by the base marking materials alone. For example, during base color gamut printing operations, an interchangeable supply container does not actually need to be connected to the receptacle, and printing operations can continue simply through the availability of the base marking materials provided by the permanent supply containers (with no interchangeable supply container being used, or even being present). Therefore, the interchangeable supply containers allow the printing device to utilize color gamuts that are not available with the base marketing materials alone.

Periodically, the processor determines the base color gamut of the base marking materials; and determines extension color gamuts of the base marking materials combined with the extension marking materials (that are potentially supplied through different interchangeable supply containers). The processor also evaluates each print job to determine the print job color gamut for each print job. The processor then finds the closest match between the print job color gamut and, either the base color gamut or one of the extension color gamuts, to identify a matching color gamut. For example, the process of determining the closest gamut match can be based, at least in part, on the greatest amount of overlap between: the print job color gamut; and the base color gamut or one of the extension color gamuts.

Color patches (or targets) are printed and then measured by a scanner creating LAB values that are used (by a color tool application) to create a map of the color gamut of a printing device. To get the base CMYK gamut, CMYK color patches are printed and measured to create the gamut map. To get CMYK plus extension color (say green), CMYK plus Green color patches are printed and measured, thus creating another gamut map. The CMYK plus Green gamut will have a bigger gamut map (in certain regions) than the CMYK gamut map, so the base will overlap the extension.

The user interface outputs an identification of the matching color gamut as determined by the processor. Additionally, if the color gamut having the greatest amount of overlap with the print color gamut is one of the extension color gamuts, the user interface can output an identification of the corresponding interchangeable supply container that contains the extension marking material that produces the matching color gamut. For example, the user interface can output the matching color gamut and the corresponding interchangeable supply container by displaying the matching color gamut and the corresponding interchangeable supply container in at least one additional column in the existing print queue, and/or by displaying the matching color gamut and the corresponding interchangeable supply container in a separate gamut queue.

Additional devices herein may not only determine the print job color gamut for each print job, but can actually evaluate each sheet of the print job to determine a print job color gamut for each sheet of the print job. Thus, the processor can determine, for each sheet of the print job, the closest match between: the print job color gamut; and the base color gamut or one of the extension color gamuts to identify a matching color gamut for each sheet of the print job. Therefore, the user interface can output an identification of the matching color gamut for each sheet of the print job and a corresponding interchangeable supply container for each sheet of the print job, if the matching color gamut is one of the extension color gamuts.

Further, the identification of the matching color gamut (and potential corresponding interchangeable supply container/extension marking material) by the processor and the outputting of the same is performed before the printing engine prints the print job, to allow the user to attach the corresponding interchangeable supply container to the receptacle, if necessary.

Various methods herein periodically (e.g., such as during manufacture, calibration, updating processes, etc.) automatically determine a base color gamut of base marking materials and extension color gamuts of extension marking materials of a specific printing device using the processor. Additionally, as each print job is received, these methods automatically evaluate each print job to determine the print job color gamut of the print job (or determine the print job color gamut of each sheet of the print job) using the processor. Then, the methods can automatically determine the closest match between: the print job (or page) color gamut; and the base color gamut or one of the extension color gamuts to identify a matching color gamut (e.g., again using the processor) based on, for example, overlap between the print job color gamut and the base color gamut or one of the extension color gamuts.

Further, these methods automatically output an identification of the matching color gamut of the print job (or for each sheet of the print job) as determined by the processor. Additionally, if the color gamut having the greatest amount of overlap with the print color gamut is one of the extension color gamuts, these methods can automatically output an identification of the corresponding interchangeable supply container. Again, the corresponding interchangeable supply container contains the extension marking material that produces the matching color gamut. For example, these methods can automatically output the matching color gamut and the corresponding interchangeable supply container of the print job (or for each sheet of the print job) by, for example, displaying the matching color gamut and the corresponding interchangeable supply container in at least one additional column in a print queue on the user interface, or displaying the matching color gamut and the corresponding interchangeable supply container in a separate gamut queue on the user interface.

Then, the user can attach the corresponding interchangeable supply container to the printing device (if required to achieve the matching color gamut) and the print job can be printed on print media using the printing device.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 5 is a schematic diagram illustrating a print queue herein;
FIG. 6 is a schematic diagram illustrating a gamut queue herein.

DETAILED DESCRIPTION

Figure 1:
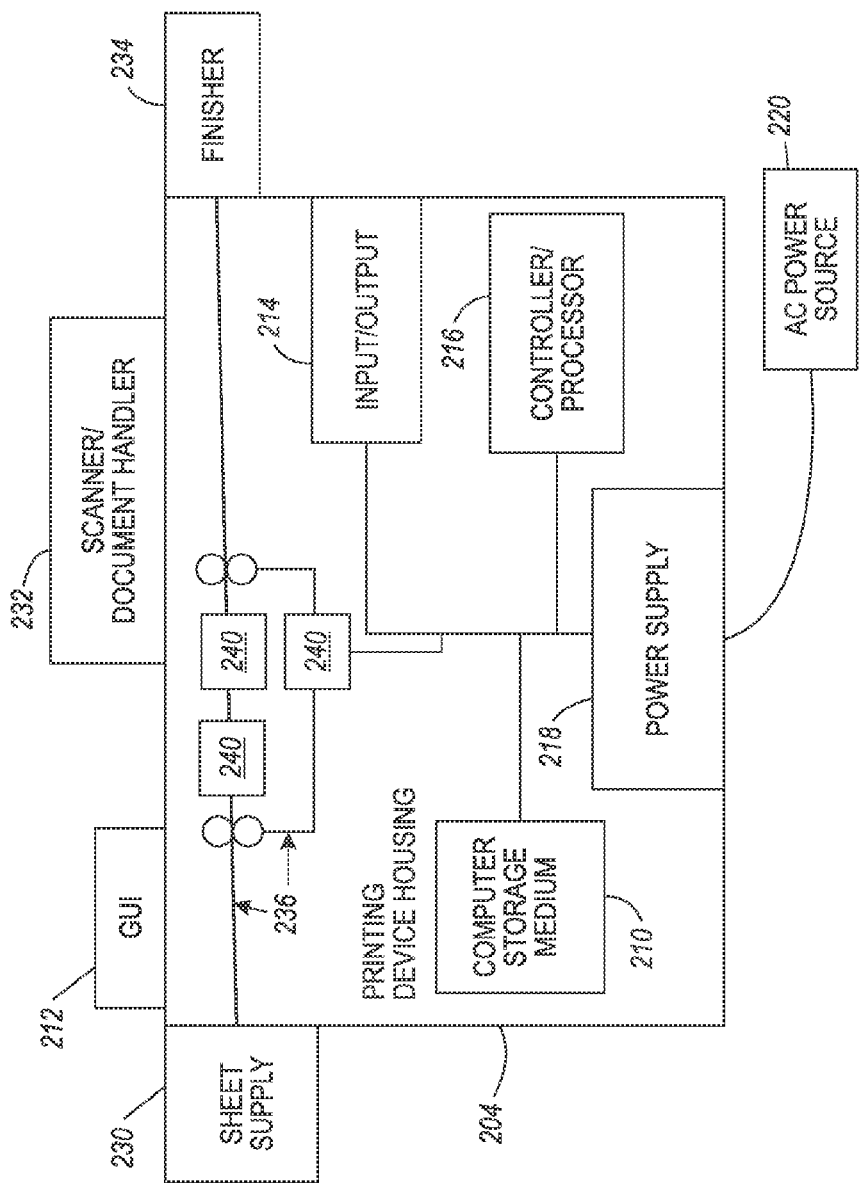
FIG. 1 is a schematic diagram illustrating devices herein.

As mentioned above, some printing devices utilize interchangeable housing units to selectively supply different extension marking materials that provide the extension color gamuts. In operation, the operator is told which color profile or gamut to use, or the user applies a trial-and-error process to determine which profile looks better in test prints. However, such processes can be inefficient and/or frustrating to the user.

Therefore, the systems and methods herein periodically and automatically determine the base color gamut (of base marking materials) and extension color gamuts (of extension marking materials combined with the base marking materials) for a specific printing device. Additionally, as each print job is received, these systems and methods automatically evaluate each print job to determine the print job color gamut of the print job using the processor. Then, the systems and methods can automatically determine the closest match between: the print job color gamut; and the base color gamut or one of the extension color gamuts to identify a matching color gamut. These systems and methods then display the "best" choice of the available profiles loaded on the system in, for example, the print queue or a separate dedicated extension color gamut queue. Thus, in one example, an additional column can be included in a standard print queue to display the "best" choice profile.

In one specific implementation, a menu option can be provided on the printing device's digital front end (DFE) to automatically determine whether a print job would be best processed using an extension color gamut (and automatically identify the interchangeable supply container that contains the extension marking material color that will produce the "best" matching color gamut). In this example, the DFE transmits base and extension color targets to the printing engine. The printing engine uses these based color targets to map the gamut of the base and extension marking colors used by the printing engine. The mapping data is then transmitted from the printing engine back to the DFE. The DFE then uses the mapping data to generate the base and extension color profiles. Additionally, deltas between the extension color profiles and the base profile can be identified. This process works like a "preflight" feature.

After the base and extension color profiles are established, as each print job is streamed to the DFE in a pre-processed state. Thus, as each print job is received, these systems and methods automatically evaluate each print job to determine the print job color gamut or profile of the print job using the processor. Then, the systems and methods can automatically determine the closest match between: the print job color profile; and the base color profile or one of the extension color profiles to identify a matching color profile. These systems and methods then display the "best" choice of the available profiles loaded on the system in, for example, the print queue or a separate dedicated extension color gamut queue. Thus, in one example, an additional column can be included in a standard print queue to display the "best" choice profile.

Alternatively, a dedicated color gamut queue could be used. Thus, if the operator is unsure of what profile to load for the print job, the operator can send the print job to the dedicated extension color gamut queue. Similarly, in this processing, each print job is evaluated to identify which base or extension color profile most closely matches (has the most overlap with) the print job color profile. These systems and methods then display the "best" choice of the previously calculated base or extension color profile loaded on the system to the operator. The matching profile is displayed in the queue and/or can be automatically loaded and attached to the print job.

In an additional alternative, the preflight process breaks the print job down to the page level, where each page is assigned a potentially unique profile (relative to the other pages of the job) depending on the gamut of the page. This is used to apply multiple profiles to a single print job, with different pages of the print job having different color profiles. This alternative addresses a concern based on the fact that extension color housing toners can be more expensive than the base toners. With this feature, if only one page of a multi-page print job calls for the use of more expensive marking material from an interchangeable supply container (extend gamut) the devices herein only draw from the interchangeable supply container for that page, and use the base color gamut for all other pages in the print job. This lowers the run cost, while still allowing at least one extended gamut, by not wasting the more expensive extension toner when not needed.

Referring now to the drawings, FIG. 1 illustrates a printing device 204, which can be used with systems and methods herein and can comprise, for example, a printer, copier, multi-function machine, multi-function device (MFD), etc. The printing device 204 includes a special-purpose controller/tangible processor 216 that includes specialized circuits that are unique to print processing, and a communications port (input/output) 214 operatively connected to the tangible processor 216 and to the computerized network 202 external to the printing device 204. Also, the printing device 204 can include at least one accessory functional component, such as a graphical user interface (GUI) assembly 212 that also operate on the power supplied from the external power source 220 (through the power supply 218). The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 216 controls the various actions of the printing device 204. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 1, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 operatively connected to the tangible processor 216, a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

Figure 2:
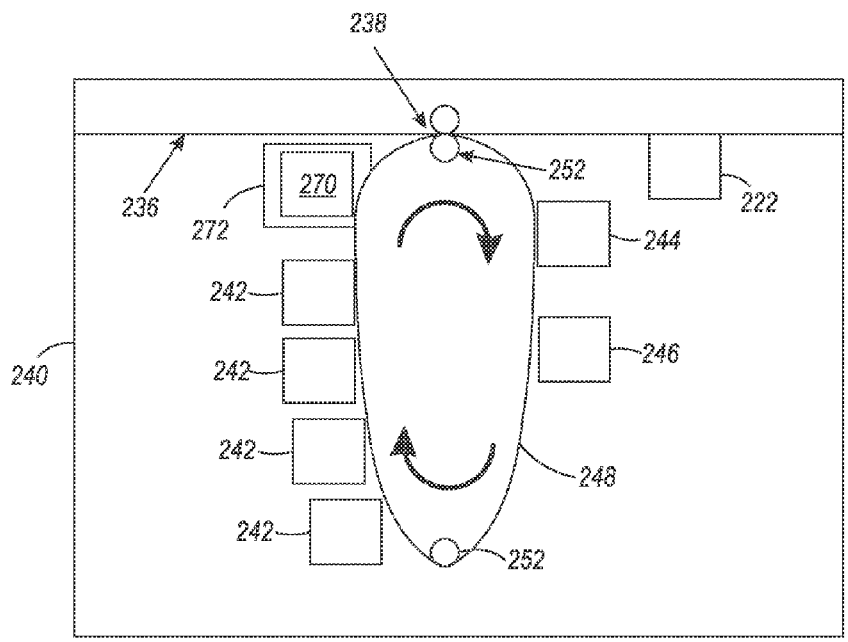
FIG. 2 is a schematic diagram illustrating devices herein.
Figure 3:
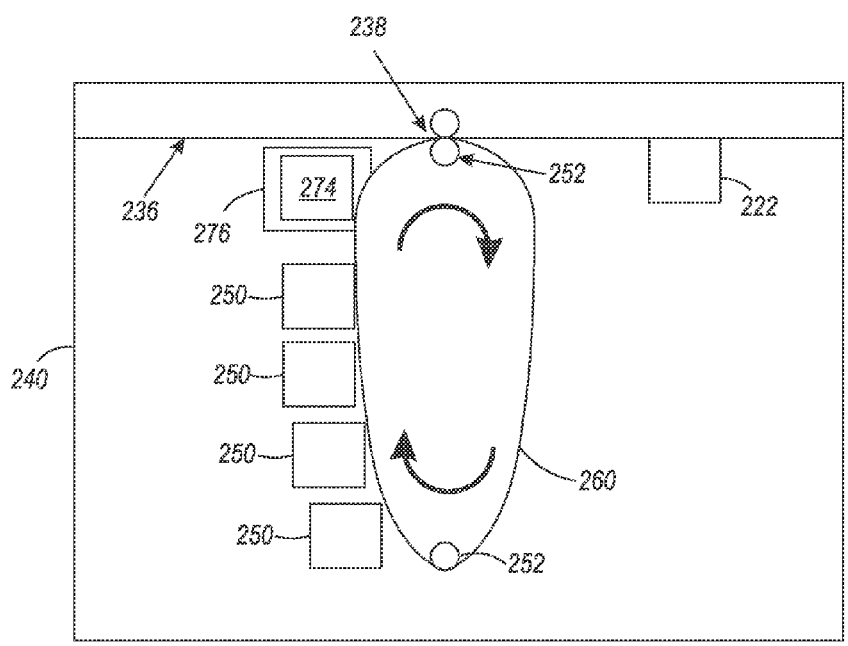
FIG. 3 is a schematic diagram illustrating devices herein.

The one or more printing engines 240 are intended to illustrate any marking device that applies a marking material (toner, inks, etc.) to continuous media or sheets of media, whether currently known or developed in the future and can include, for example, devices that use a photoreceptor belt 248 (as shown in FIG. 2) or an intermediate transfer belt 258 (as shown in FIG. 3), or devices that print directly to print media (e.g., inkjet printers, ribbon-based contact printers, etc.).

More specifically, FIG. 2 illustrates one example of the above-mentioned printing engine(s) 240 that uses one or more (potentially different color) development stations 242 adjacent a photoreceptor belt 248 supported on rollers 252. Thus, in FIG. 2 an electronic or optical image or an image of an original document or set of documents to be reproduced may be projected or scanned onto a charged surface of the photoreceptor belt 248 using an imaging device (sometimes called a raster output scanner (ROS)) 246 to form an electrostatic latent image. Thus, the electrostatic image can be formed onto the photoreceptor belt 248 using a blanket charging station/device 244 (and item 244 can include a cleaning station or a separate cleaning station can be used) and the imaging station/device 246 (such as an optical projection device, e.g., raster output scanner). Thus, the imaging station/device 246 changes a uniform charge created on the photoreceptor belt 248 by the blanket charging station/device 244 to a patterned charge through light exposure, for example.

The photoreceptor belt 248 is driven (using, for example, driven rollers 252) to move the photoreceptor in the direction indicated by the arrows past the development stations 242, and a transfer station 238. Note that devices herein can include a single development station 242, or can include multiple development stations 242, each of which provides marking material (e.g., charged toner) that is attracted by the patterned charge on the photoreceptor belt 248. The same location on the photoreceptor belt 248 is rotated past the imaging station 246 multiple times to allow different charge patterns to be presented to different development stations 242, and thereby successively apply different patterns of different colors to the same location on the photoreceptor belt 248 to form a multi-color image of marking material (e.g., toner) which is then transferred to print media at the transfer station 238.

As is understood by those ordinarily skilled in the art, the transfer station 238 generally includes rollers and other transfer devices. Further, item 222 represents a fuser device that is generally known by those ordinarily skilled in the art to include heating devices and/or rollers that fuse or dry the marking material to permanently bond the marking material to the print media.

Thus, in the example shown in FIG. 2, which contains four different base color development stations 242 and an extension development station 270, the photoreceptor belt 248 is rotated through multiple revolutions in order to allow each of the development stations 242, 270 to transfer a different color marking material (where each of the development stations 242, 270 transfers marking material to the photoreceptor belt 248 during a different revolution). After all such revolutions, different colors have been transferred to the same location of the photoreceptor belt, thereby forming a complete multi-color image on the photoreceptor belt, after which the complete multi-color image is transferred to print media, traveling along the media path 236, at the transfer station 238.

The base color development stations 242 are (or can include) permanent supply containers that are operatively connected to the processor 216. In addition, the extension development station 270 is (or can include) an interchangeable supply container that connects to at least one receptacle 272. In other words, the extension development station 270 can include an integral interchangeable supply container (or housing unit) or the interchangeable supply container can be a separate element from the remainder of the extension development station 270, and for convenience, the interchangeable supply container and extension development station are referred to as the same item herein (item 270). The extension development station 270 is similarly operatively connected to the processor. The permanent supply containers 242 maintain base marking materials used by the printing engine to print. While the permanent supply containers 242 can be replaced or refilled as their contents are consumed, the permanent supply containers 242 (and the same color base marking materials) are always present within the printing apparatus 204 whenever any printing operation is performed.

The receptacle 272 is shaped to connect to the interchangeable supply containers 270 that maintain extension marking materials used by the printing engine 240 to print. The extension marking materials are different colors than the colors of the base marking materials. The extension marking materials are for printing operations that utilizes color gamuts that are different than those color gamuts available with the base marking materials alone. For example, the base marking materials can consist of cyan, magenta, yellow, and black (CMYK); or any other base marking material set; while the extension marking materials can be colors other than CMYK (such as orange, green, violet, etc.).

In contrast to the permanent supply containers 242 that always make the base marking materials available to the printing engine 240 for all printing operations, the interchangeable supply containers 270 may or may not be used, and different interchangeable supply containers 270 will be used to provide different color gamuts that are not provided by the base marking materials alone. For example, during base color gamut printing operations, an interchangeable supply container 270 does not actually need to be connected to the receptacle 272, and printing operations can continue simply through the availability of the base marking materials provided by the permanent supply containers 242 (with no interchangeable supply container 270 being used, or even being present). Therefore, the interchangeable supply containers 270 allow the printing device 204 to utilize color gamuts that are not available with the base marking materials alone.

Alternatively, printing engine(s) 240 shown in FIG. 1 can utilize one or more potentially different color marking stations 250, 274 and an intermediate transfer belt (ITB) 260 supported on rollers 252, as shown in FIG. 3. The marking stations 250, 274 can be any form of marking station, whether currently known or developed in the future, such as individual electrostatic marking stations, individual inkjet stations, individual dry ink stations, etc. Each of the marking stations 250, 274 transfers a pattern of marking material to the same location of the intermediate transfer belt 260 in sequence during a single belt rotation (potentially independently of a condition of the intermediate transfer belt 260) thereby, reducing the number of passes the intermediate transfer belt 260 must make before a full and complete image is transferred to the intermediate transfer belt 260.

Figure 4:
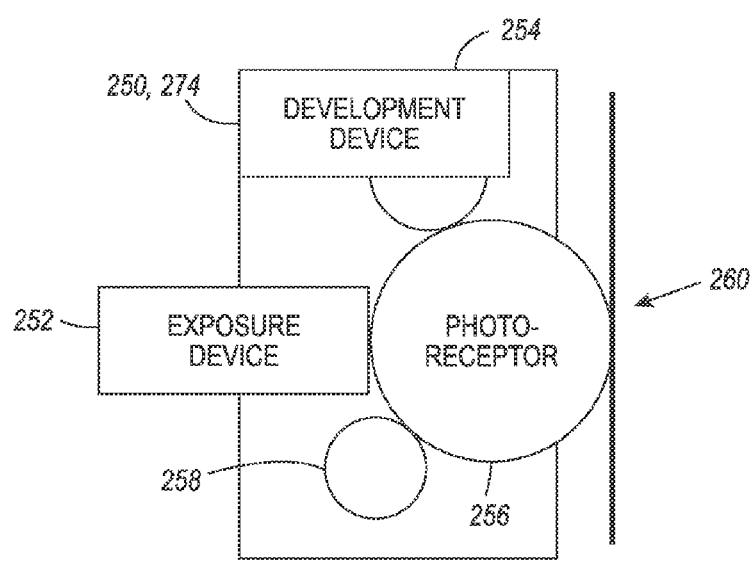
FIG. 4 is a schematic diagram illustrating devices herein.

One exemplary individual electrostatic marking station (which can represent items 250 or 274) is shown in FIG. 4 positioned adjacent to (or potentially in contact with) intermediate transfer belt 260. Each of the individual electrostatic marking stations 250, 274 includes its own charging station 258 that creates a uniform charge on an internal photoreceptor 256, an internal exposure device 252 that patterns the uniform charge, and an internal development device 254 that transfers marking material to the photoreceptor 256. The pattern of marking material is then transferred from the photoreceptor 256 to the intermediate transfer belt 260 and eventually from the intermediate transfer belt to the marking material at the transfer station 238.

Similar to the discussion of FIG. 2, the base electrostatic marking stations 250 are (or can include) permanent supply containers that are operatively connected to the processor 216. In addition, the extension electrostatic marking station 274 is (or can include) an interchangeable supply container that connects to at least one receptacle 276. In other words, the extension electrostatic marking station 274 can include an integral interchangeable supply container (or housing unit) or the interchangeable supply container can be a separate element from the remainder of the extension electrostatic marking station 274, and for convenience, the interchangeable supply container and extension development station are referred to as the same item herein (item 274). The extension development station 274 is similarly operatively connected to the processor. The permanent supply containers 250 maintain base marking materials used by the printing engine to print. While the permanent supply containers 250 can be replaced or refilled as their contents are consumed, the permanent supply containers 250 (and the same color base marking materials) are always present within the printing apparatus 204 whenever any printing operation is performed.

The receptacle 276 is shaped to connect to the interchangeable supply containers 274 that maintain extension marking materials used by the printing engine 240 to print. The extension marking materials are different colors than the colors of the base marking materials. The extension marking materials are for printing operations that utilizes color gamuts that are different than those color gamuts available with the base marking materials alone. For example, the base marking materials can consist of cyan, magenta, yellow, and black (CMYK); or any other base marking material set; while the extension marking materials can be colors other than CMYK (such as orange, green, violet, etc.).

In contrast to the permanent supply containers 250 that always make the base marking materials available to the printing engine 240 for all printing operations, the interchangeable supply containers 274 may or may not be used, and different interchangeable supply containers 274 will be used to provide different color gamuts that are not provided by the base marking materials alone. For example, during base color gamut printing operations, an interchangeable supply container 274 does not actually need to be connected to the receptacle 276, and printing operations can continue simply through the availability of the base marking materials provided by the permanent supply containers 250 (with no interchangeable supply container 274 being used, or even being present). Therefore, the interchangeable supply containers 274 allow the printing device 204 to utilize color gamuts that are not available with the base marking materials alone.

While FIGS. 2 and 3 illustrate four base color marking stations 242, 250 adjacent or in contact with a rotating belt (248, 260), which is useful with systems that mark in four different base colors such as cyan, magenta, yellow, and black (CMYK), as would be understood by those ordinarily skilled in the art, such devices could use any number of base marking stations (e.g., 2, 3, 5, 8, 11, etc.).

Thus, in printing devices 204 herein a latent image can be developed with developing material to form a toner image corresponding to the latent image. Then, a sheet is fed from a selected paper tray supply 230 to a sheet transport 236 for travel to a transfer station 238. There, the image is transferred to a print media material, to which it may be permanently fixed by a fusing device 222. The print media is then transported by the sheet output transport 236 to output trays or a multi-function finishing station 234 performing different desired actions, such as stapling, hole-punching and C or Z-folding, a modular booklet maker, etc., although those ordinarily skilled in the art would understand that the finisher/output tray 234 could comprise any functional unit.

As would be understood by those ordinarily skilled in the art, the printing device 204 shown in FIG. 1 is only one example and the systems and methods herein are equally applicable to other types of printing devices that may include fewer components or more components. For example, while a limited number of printing engines and paper paths are illustrated in FIG. 1, those ordinarily skilled in the art would understand that many more paper paths and additional printing engines could be included within any printing device used with systems and methods herein.

Periodically, the processor 216 determines the base color gamut of the base marking materials; and determines extension color gamuts of the base marking materials combined with the extension marking materials (that are potentially supplied through different interchangeable supply containers 270, 274). The processor 216 also evaluates each print job to determine the print job color gamut for each print job. The processor 216 then finds the closest match between the print job color gamut and, either the base color gamut or one of the extension color gamuts, to identify a matching color gamut. For example, the process of determining the closest gamut match can be based, at least in part, the greatest amount of overlap between: the print job color gamut; and the base color gamut or one of the extension color gamuts.

The user interface 212 outputs an identification of the matching color gamut as determined by the processor 216. Additionally, if the color gamut having the greatest amount of overlap with the print color gamut is one of the extension color gamuts, the user interface 212 can output an identification of the corresponding interchangeable supply container 270, 274 that contains the extension marking material that produces the matching color gamut.

The user interface 212 can output such an identification of the matching color gamut using any form of display, including a message, a pop-up window, a queue column, etc. Two exemplary outputs of the matching color gamut that can be presented on the user interface 212 are shown as queues in FIGS. 5 and 6. For example, the user interface 212 can output the matching color gamut and the corresponding interchangeable supply container 270, 274 by displaying the matching color gamut 308 and the extension toner housing unit of the corresponding interchangeable supply container 310 in at least one additional column in the existing print queue 300 (that would otherwise just display print job identification 302, status 304, and owner 306). Similarly, as shown in FIG. 6, the matching color gamut and the corresponding interchangeable supply container in a separate gamut queue 320 that lists the print job identification 322, owner 324, color gamut 326, and extension toner housing unit of the corresponding interchangeable supply container 328.

Additional devices herein may not only determine the print job color gamut for each print job, but can actually evaluate each sheet of the print job to determine a print job color gamut for each sheet of the print job. Thus, the processor 216 can determine, for each sheet of the print job, the closest match between: the print job color gamut; and the base color gamut or one of the extension color gamuts to identify a matching color gamut for each sheet of the print job. Therefore, the user interface 212 can output an identification of the matching color gamut for each sheet of the print job and a corresponding interchangeable supply container 310, 328 for each sheet of the print job as shown by the optional page identification columns 312 and 330 in FIGS. 5 and 6.

Further, the identification of the matching color gamut (and potential corresponding interchangeable supply container 270, 274/extension marking material) by the processor 216 and the outputting of the same is performed before the printing engine 240 prints the print job, to allow the user to attach the corresponding interchangeable supply container 270, 274 to the receptacle, if necessary.

Figure 7:
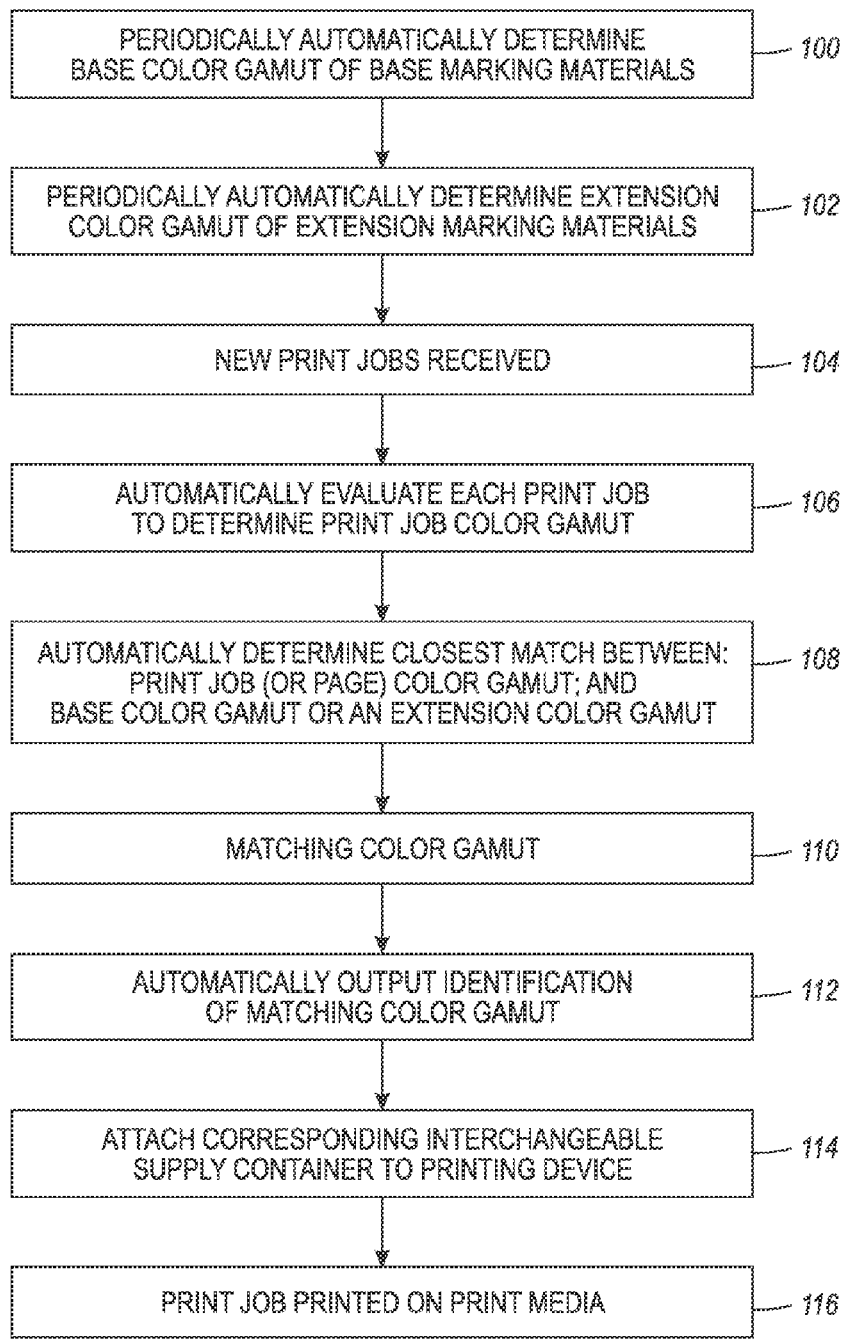
FIG. 7 is a flow diagram of various methods herein.

FIG. 7 is flowchart illustrating exemplary methods herein. As shown in FIG. 7, various methods herein periodically (e.g., such as during manufacture, calibration, updating processes, etc.) automatically determine a base color gamut of base marking materials 100 and extension color gamuts of extension marking materials 102 of a specific printing device. Additionally, as each print job is received in item 104, these methods automatically evaluate each print job to determine the print job color gamut of the print job (or determine the print job color gamut of each sheet of the print job) in item 106. Then, in item 108, the methods can automatically determine the closest match between: the print job (or page) color gamut; and the base color gamut or one of the extension color gamuts to identify a matching color gamut in item 110 (e.g., again using the processor) based on, for example, overlap between the print job color gamut and the base color gamut or one of the extension color gamuts.

Further, these methods automatically output an identification of the matching color gamut of the print job (or for each sheet of the print job) in item 112. Additionally, in item 112, if the color gamut having the greatest amount of overlap with the print color gamut is one of the extension color gamuts, these methods can automatically output an identification of the corresponding interchangeable supply container. Again, the corresponding interchangeable supply container contains the extension marking material that produces the matching color gamut. For example, in item 112, these methods can automatically output the matching color gamut and the corresponding interchangeable supply container of the print job (or for each sheet of the print job) by, for example, displaying the matching color gamut and the corresponding interchangeable supply container in at least one additional column in a print queue on the user interface, or displaying the matching color gamut and the corresponding interchangeable supply container in a separate gamut queue on the user interface.

Then, in item 114, the user can attach the corresponding interchangeable supply container to the printing device (if required to achieve the matching color gamut) and the print job can be printed on print media using the printing device in item 116.

Figure 8:
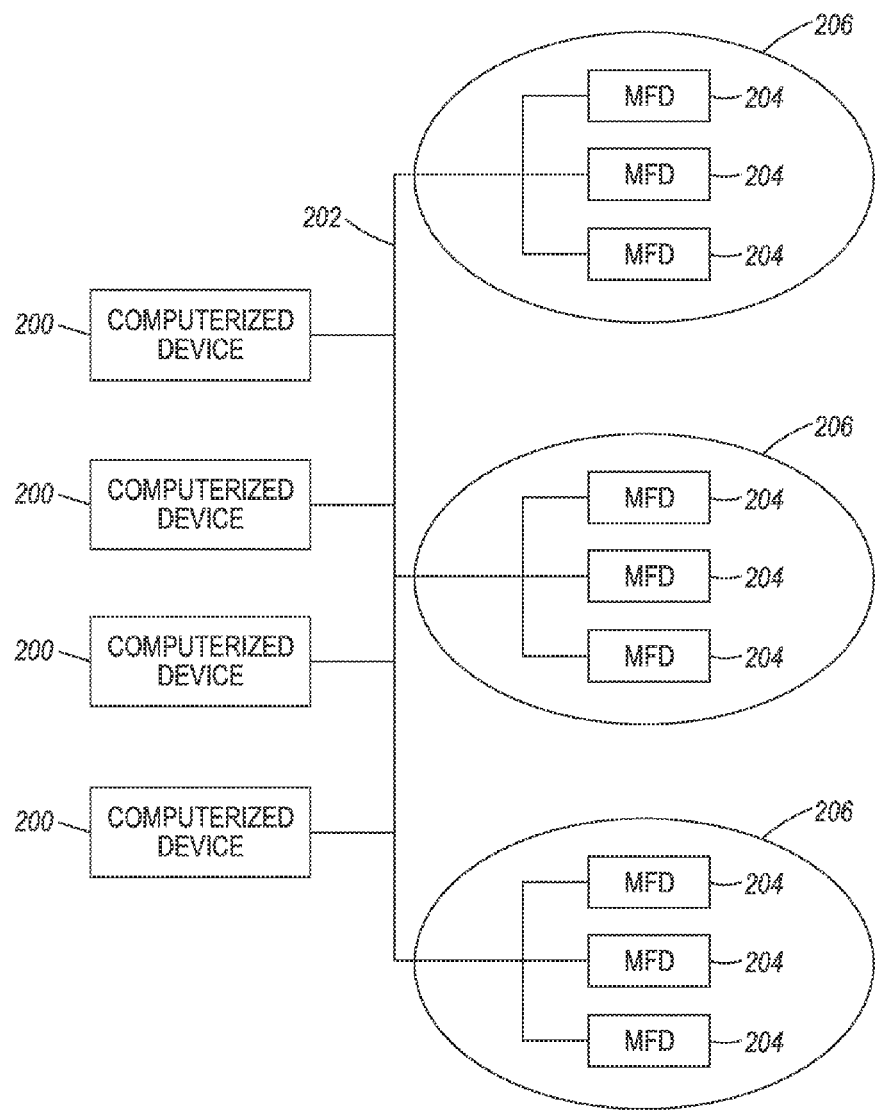
FIG. 8 is a schematic diagram illustrating systems herein.

As shown in FIG. 8, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202. Any of these devices can perform the processing shown in FIG. 7, locally or remotely.

Figure 9:
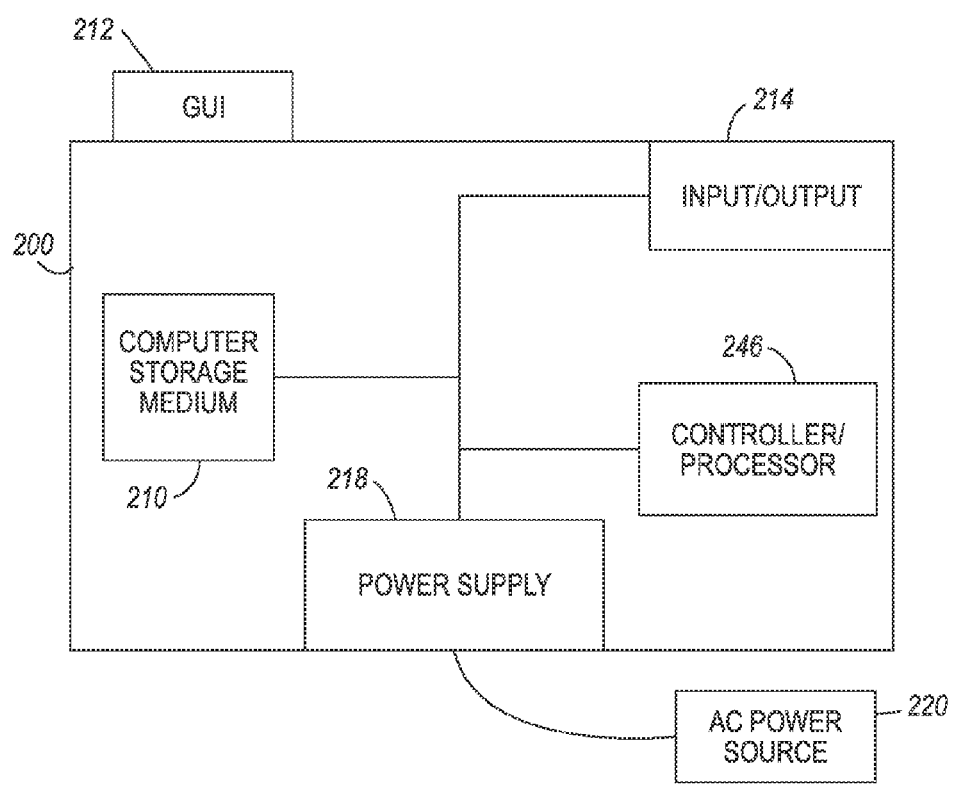
FIG. 9 is a schematic diagram illustrating devices herein.

FIG. 9 illustrates a computerized device 200, which can be used with systems and methods herein and can comprise, for example, a print server, a personal computer, a portable computing device, etc. In a similar manner to the printing device shown in FIG. 1, the computerized device 200 shown in FIG. 9 includes a general-purpose controller/tangible processor 246 and a communications port (input/output) 214 operatively connected to the tangible processor 246 and to the computerized network 202 external to the computerized device 200. Also, the computerized device 200 can include at least one accessory functional component, such as a graphical user interface (GUI) assembly 212 that also operate on the power supplied from the external power source 220 (through the power supply 218). The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 246 controls the various actions of the computerized device. A non-transitory, tangible, computer storage medium device 210 (which can be optical, magnetic, capacitor based, etc., and is different from a transitory signal) is readable by the tangible processor 246 and stores instructions that the tangible processor 246 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:
a processor;
a user interface operatively connected to said processor;
a printing engine operatively connected to said processor;
permanent supply containers operatively connected to said processor, said permanent supply containers maintaining base marking materials used by said printing engine to print; and
a receptacle operatively connected to said processor,
said receptacle having a shape to connect to interchangeable supply containers maintaining extension marking materials used by said printing engine to print,
said extension marking materials being different colors than said base marking materials,
said processor determining a base color gamut of said base marking materials and extension color gamuts of said extension marking materials,
said processor evaluating a print job to determine a print job color gamut of said print job,
said processor determining a closest match between: said print job color gamut; and said base color gamut or one of said extension color gamuts to identify a matching color gamut, and
said user interface outputting an identification of said matching color gamut and a corresponding interchangeable supply container if said matching color gamut is one of said extension color gamuts.

2. The printing apparatus according to claim 1, said user interface outputting said matching color gamut and said corresponding interchangeable supply container by at least one of:
displaying said matching color gamut and said corresponding interchangeable supply container in at least one additional column in a print queue; and
displaying said matching color gamut and said corresponding interchangeable supply container in a gamut queue.

3. The printing apparatus according to claim 1, said processor determining an overlap between said print job color gamut and said base color gamut or one of said extension color gamuts, said determining said closest match being based, in part, on said overlap.

4. The printing apparatus according to claim 1, said processor determining said closest match and said user interface outputting said matching color gamut and said corresponding interchangeable supply container before said printing engine prints said print job.

5. The printing apparatus according to claim 1, said base marking materials consisting of cyan, magenta, yellow, and black (CMYK), and said extension marking materials being colors other than CMYK.

6. A printing apparatus comprising:
a processor;
a user interface operatively connected to said processor;
a printing engine operatively connected to said processor;
permanent supply containers operatively connected to said processor, said permanent supply containers maintaining base marking materials used by said printing engine to print; and
a receptacle operatively connected to said processor,
said receptacle having a shape to connect to interchangeable supply containers maintaining extension marking materials used by said printing engine to print,
said extension marking materials being different colors than said base marking materials, said processor determining a base color gamut of said base marking materials and extension color gamuts of said extension marking materials, said processor evaluating each sheet of a print job to determine a print job color gamut for each sheet of said print job, said processor determining, for each sheet of said print job, a closest match between: said print job color gamut; and said base color gamut or one of said extension color gamuts to identify a matching color gamut for each sheet of said print job, and said user interface outputting an identification of said matching color gamut for each sheet of said print job and a corresponding interchangeable supply container for each sheet of said print job if said matching color gamut is one of said extension color gamuts.

7. The printing apparatus according to claim 6, said user interface outputting said matching color gamut and said corresponding interchangeable supply container by at least one of:

displaying said matching color gamut and said corresponding interchangeable supply container in at least one additional column in a print queue; and displaying said matching color gamut and said corresponding interchangeable supply container in a gamut queue.

8. The printing apparatus according to claim 6, said processor determining an overlap between said print job color gamut and said base color gamut or one of said extension color gamuts, said determining said closest match being based, in part, on said overlap.

9. The printing apparatus according to claim 6, said processor determining said closest match and said user interface outputting said matching color gamut and said corresponding interchangeable supply container before said printing engine prints said print job.

10. The printing apparatus according to claim 6, said base marking materials consisting of cyan, magenta, yellow, and black (CMYK), and said extension marking materials being colors other than CMYK.

11. A method comprising:

automatically determining a base color gamut of base marking materials and extension color gamuts of extension marking materials using a processor, said processor being operatively connected to a printing engine, said printing engine being operatively connected to permanent supply containers, said printing engine being operatively connected to a receptacle, said permanent supply containers maintaining said base marking materials used by said printing engine to print, said receptacle having a shape to connect to interchangeable supply containers maintaining said extension marking materials used by said printing engine to print, said extension marking materials being different colors than said base marking materials;

automatically evaluating a print job to determine a print job color gamut of said print job using said processor;

automatically determining a closest match between: said print job color gamut; and said base color gamut or one of said extension color gamuts to identify a matching color gamut using said processor; and automatically outputting an identification of said matching color gamut and a corresponding interchangeable supply container if said matching color gamut is one of said extension color gamuts, using a user interface operatively connected to said processor.

12. The method according to claim 11, said outputting said matching color gamut and said corresponding interchangeable supply container comprising at least one of:

displaying said matching color gamut and said corresponding interchangeable supply container in at least one additional column in a print queue on said user interface; and displaying said matching color gamut and said corresponding interchangeable supply container in a gamut queue on said user interface.

13. The method according to claim 11, further comprising determining an overlap between said print job color gamut and said base color gamut or one of said extension color gamuts, said determining said closest match being based, in part, on said overlap.

14. The method according to claim 11, said determining said closest match and said outputting said matching color gamut and said corresponding interchangeable supply container being performed before said printing engine prints said print job.

15. The method according to claim 11, said base marking materials consisting of cyan, magenta, yellow, and black (CMYK), and said extension marking materials being colors other than CMYK.

16. A method comprising:

automatically determining a base color gamut of base marking materials and extension color gamuts of extension marking materials using a processor, said processor being operatively connected to a printing engine, said printing engine being operatively connected to permanent supply containers, said printing engine being operatively connected to a receptacle, said permanent supply containers maintaining said base marking materials used by said printing engine to print, said receptacle having a shape to connect to interchangeable supply containers maintaining said extension marking materials used by said printing engine to print, said extension marking materials being different colors than said base marking materials;

automatically evaluating each sheet of a print job to determine a print job color gamut for each sheet of said print job using said processor;

automatically determining, for each sheet of said print job, a closest match between: said print job color gamut; and said base color gamut or one of said extension color gamuts to identify a matching color gamut for each sheet of said print job using said processor; and automatically outputting an identification of said matching color gamut for each sheet of said print job and a corresponding interchangeable supply container if said matching color gamut is one of said extension color gamuts, using a user interface operatively connected to said processor.

17. The method according to claim 16, said outputting said matching color gamut and said corresponding interchangeable supply container comprising at least one of:

displaying said matching color gamut and said corresponding interchangeable supply container in at least one additional column in a print queue on said user interface; and displaying said matching color gamut and said corresponding interchangeable supply container in a gamut queue on said user interface.

18. The method according to claim 16, further comprising determining an overlap between said print job color gamut and said base color gamut or one of said extension color gamuts, said determining said closest match being based, in part, on said overlap.

19. The method according to claim 16, said determining said closest match and said outputting said matching color gamut and said corresponding interchangeable supply container being performed before said printing engine prints said print job.

20. The method according to claim 16, said base marking materials consisting of cyan, magenta, yellow, and black (CMYK), and said extension marking materials being colors other than CMYK.

\* \* \* \* \*